Jan. 7, 1958 G. BUNGAS 2,819,044
AIR-CONDITIONING APPARATUS
Filed Aug. 30, 1955

INVENTOR.
GEORGE BUNGAS.
BY Christy, Parmelee and Strickland
his ATTORNEYS.

2,819,044

AIR-CONDITIONING APPARATUS

George Bungas, Pittsburgh, Pa.

Application August 30, 1955, Serial No. 531,459

5 Claims. (Cl. 257—9)

My invention relates to air-conditioning apparatus, and consists in certain new and useful improvements in construction.

The apparatus of the invention embodies in a unitary structure means that are operable in warm weather to cool the atmosphere of a home or other building, while in the cold season the apparatus operates to heat the atmosphere.

Essentially the apparatus of the invention comprises a tank for a body of water, or other suitable liquid, and in such body a plenum chamber having heat-conducting walls is submerged. A blower is arranged to propel air through such chamber into the space or atmosphere to be conditioned. Heat-exchange means develop temperatures in the body of water at variance with the temperature of the air flowing through the plenum chamber, whereby there is a transfer of heat between the flowing air and the body of water, with the effect that the flowing air is thermally conditioned for the purpose intended. As thus far described the apparatus lies in the domain of the prior art.

The object of my invention is to provide improvements in the construction and in the structural organization of apparatus of the sort mentioned, whereby thermal efficiency in greater measure is obtained, and a more commercially practical apparatus realized.

In the accompanying drawings an apparatus embodying the invention is illustrated, in which.

Figure 1:
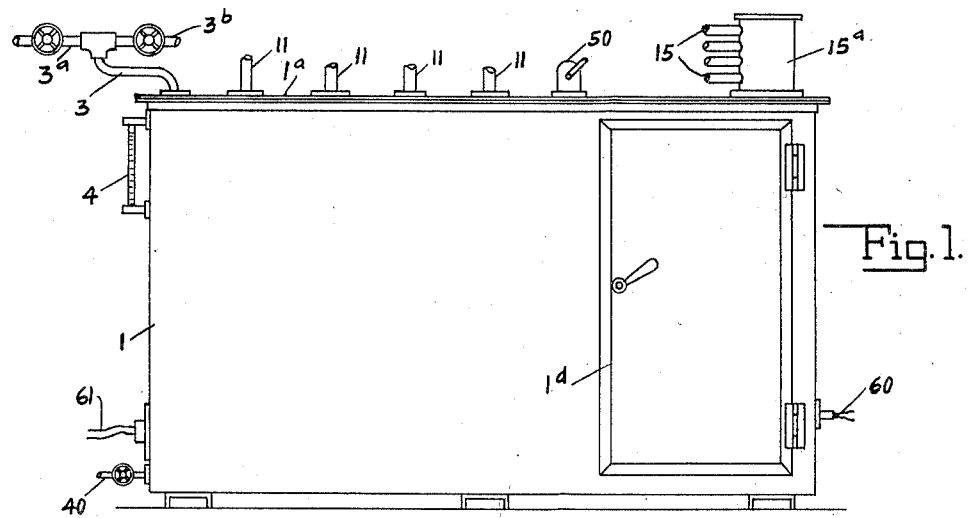
Fig. 1 is a view of the apparatus in side elevation.
Figure 2:
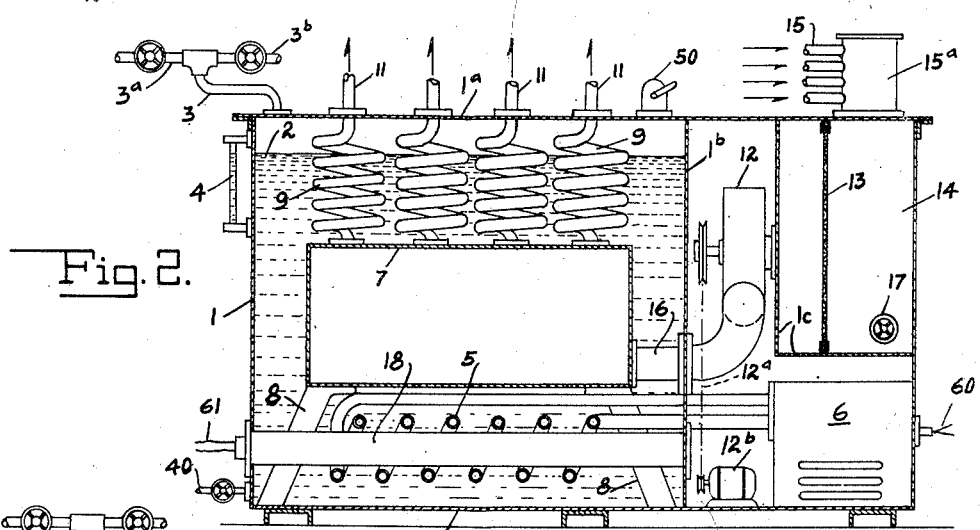
Fig. 2 is a view of the same vertical section.

Referring to Figs. 1 and 2 of the drawings the apparatus comprises a tank 1 in which a large body 2 of water is contained, the water being charged into the tank by a supply pipe 3 connected to the tank at or near its top. Either hot water may be delivered by a line 3a, or cold water by a line 3b, depending upon whether the apparatus is at the time in use as a heating or as a cooling unit. A sight glass 4 is arranged to indicate the water level in the tank, and a valved drain line 40 is connected to the bottom of the tank, whereby the tank may be drained once a year, say, for inspection. A safety valve 50 is provided on the tank, to safeguard the apparatus in the event that excessive vapor pressure should develop therein.

A plenum chamber 7, formed with heat-conducting walls of sheet metal, is supported on legs 8 within the body of water, and a plurality of coiled tubes 9, communicating at their lower ends with the interior of chamber 7, extend upwardly through the water and the cover 1a of the tank, where they open severally into ducts 11 that lead to the rooms to be air conditioned.

A blower 12, driven by a belt 12a and an electric motor 12b, draws air through a renewable filter 13, from a receiver chamber 14, into which, by way of a header 15a, ducts 15 return air severally from the rooms served by the delivery ducts 11. The blower 12 delivers filtered air through a pipe 16, plenum chamber 7, pipe coils 9, and ducts 11 to the rooms to be serviced. In flowing through the pipe 16, plenum chamber 7 and pipe coils 9 the filtered air is thermally conditioned by the enveloping body of water 2. Thus, a continuous circulation of air is established through the air conditioning apparatus to the rooms served and back to the apparatus; that is to say, filtered and conditioned air delivered to the rooms, and spent air from the rooms is returned for reconditioning. The receiver chamber 14 includes an adjustable inlet 17, by means of which a desired quantity of new or make-up air is admitted from the outer atmosphere to the circulating stream.

Advantageously a single cabinet, formed of sheet or plate steel, is adapted to provide a unitary enclosure for the entire apparatus, save for the ducts 11 and 15 leading to and from the rooms to be conditioned. A transverse partition 1b defines the length of the water-containing tank, and a partition 1c defines within the cabinet the air-filtering receiver within the cabinet, while the space between partitions 1b and 1c, together with the space below partition 1c, provides room for the blower 12, its drive 12a, 12b and a refrigerator unit 6, presently to be described. As shown in Fig. 1, a door 1d on the side of the cabinet gives access to the space or so-called machinery compartment within the cabinet to the right of partition 1b, whereby the blower, blower drive and refrigerator unit may be serviced, and the filter 13 removed for cleaning or replacement.

Heat-exchange means are provided for maintaining the body 2 of water at a temperature selectively either above or below normal or room temperature, depending on whether the rooms are to be heated or cooled. Such heat-exchange means comprise two thermal systems having heat-conducting walls, each system containing within its walls means for developing temperatures at substantial variance with the temperature of the body 2 of water. One system comprises a heat-abstracting or cooling device in the form of a coiled evaporation or expansion tube 5 of the refrigerator unit 6. The refrigerator unit may be a conventional piece of equipment which compresses and condenses a fluid refrigerant, expands or evaporates the condensed refrigerant in tube or coil 5, and draws the evaporated refrigerant back to the unit. It is needless to concern this specification with the structural details of the refrigerator unit; suffice it to say that the unit may be connected to a source of electrical power by circuit wires 60, and that as long as the unit remains in operation the evaporating and expanding refrigerant forms means within the walls of coil 5 for abstracting heat from the body 2 of water.

The unit 6 may be responsive to the usual thermostatic controls (not shown) whereby, when the temperature of the room or rooms to be air conditioned rises to a predetermined value, the unit is caused to operate automatically to cool the body of water 2, and the cool water is caused to cool air that is delivered into the rooms. When the temperature of the rooms falls to desired value, the thermostatic controls automatically arrest the operation of the unit 6, and thus the "on and off" operation of the unit 6 may be automatically controlled during hot weather to maintain the desired temperature in the air-conditioned rooms. The thermostatic controls are well known to the art and this specification need not be further involved with them.

The second heat-exchange system of the apparatus comprises a heating device in the form of one or more tubes 18 whose walls are formed of heat-conducting metal, and within such walls means are provided for generating heat for transfer to the body 2 of water. The heating means within the tube 18 may be an electrical resistor of well-known type, energized by electrical current delivered through circuit wires 61. Alternatively, gas or other fluid fuel may be burned within the tube to develop the essential heat. Accordingly, the water may be heated, and such heat may be transmitted from the water, through the walls of the plenum chamber 7 and coiled ducts 9, to the air delivered to the rooms to be air-conditioned. It will be understood that conventional thermostatic instruments may be arranged to control the operation of the heat-generating means within the tube or tubes 18, so that, during cold weather, when the temperature within the rooms falls below that at which the functioning of the refrigerator unit 6 is designed to hold it, heat is automatically developed in the tube 18 and the water 2 heated, with the effect that the air delivered to the rooms is heated, until the temperature in the rooms rises to substantially the point at which the refrigerator unit is designed to cool the room. Then the generation of heat in tubes 18 is arrested.

Thus it is that in all kinds of weather the apparatus is effective to maintain the serviced rooms at desired temperature.

It will be perceived that when either of the heat-exchange systems 5, 6 or 18 is in operation there is a transfer of heat to or from the body 2 of water. This transfer of heat may be termed a primary heat transfer. In consequence of the operation of either heat-exchange system, under the conditions described, the temperature of the body of water is normally held at substantial variance with that of the air circulated by the blower 12, whereby there is a heat transfer between the body of water and the air flowing through the duct 16, the plenum chamber 7 and the coiled ducts 9. The latter transfer of heat may be known as a secondary heat transfer.

We now come to a feature of importance, a feature that forms a major contribution to the improved utility and high thermal efficiency of the apparatus of the invention.

It has already been mentioned that the plenum chamber 7 is mounted within and enveloped by the body 2 of water at a substantial interval above the bottom (1e) of the tank 1. The tube elements 5 and 18 of the two heat-exchange systems of the apparatus are arranged at an interval above the bottom of the tank and at an interval below the floor of the plenum chamber 7, and are entirely enveloped or surrounded by, and immersed in, the water above the tank bottom and below the plenum chamber floor. This structural organization affords greater operational advantages and higher thermal efficiency than is to be found in pre-existing structures in the air-conditioning art.

It is contemplated that a system of baffles may be provided in the plenum chamber to obtain a tortuous and elongated course of flow of the air through such chamber, but such structural detail, apart from the improved assembly described above, is known to the art, wherefore illustration is not required herein.

Figure 3:
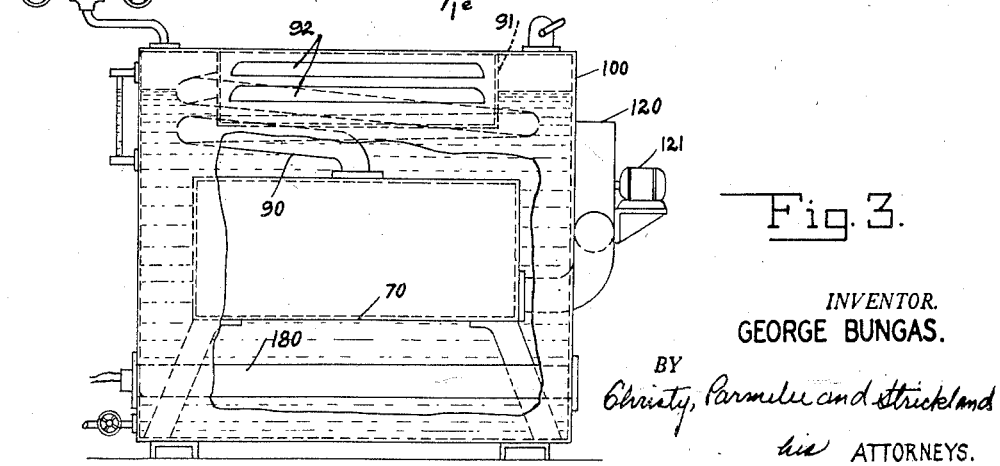
Fig. 3 is a view in side elevation of a modified form of the apparatus, the housing of the apparatus being broken away fragmentarily to show certain elements therein contained.

In some cases the apparatus may be required to serve only as a room heater, in which event the water-cooling system (5, 6) will be omitted from the assembly of Figs. 1 and 2. And in those cases where the apparatus is installed immediately in the room to be heated, the ducts 11 and 15 may be omitted. The air passing through the apparatus may be drawn from the room through a single inlet, and the heated air delivered directly into the room. For example, as shown in Fig. 3, the blower 120 may be mounted on one end wall of the tank 100, and the blower may be directly driven by the motor 121. The air is drawn through the inlet of the blower, delivered through the plenum chamber 70, through the single coiled duct 90 into a chest 91, and thence delivered through louvered openings 92 in the wall of the tank into the room. It will be understood that in the simplified or modified apparatus of Fig. 3 the water-heating duct 180 of the heat-exchange system is disposed above the bottom of the tank and below the floor of the plenum chamber, in the particularly effective organization described of the ducts 5 and 18 of the apparatus of Figs. 1 and 2.

In further modification, if the apparatus is desired to serve as a cooling unit, the structure shown in Fig. 3 will serve, modified only by the replacement of the duct 180 by the coiled duct 5 of Fig. 2, and by mounting the refrigerating unit 6, either within the cabinet, as in Fig. 2, or any suitable place externally of the tank 100.

The helically coiled form of the submerged tubes 9 and 90 is a matter of importance. Not merely does such form of the tubes afford within a tank of specified dimensions maximum area of thermal transfer between the contained liquid and the air passing through the apparatus, but equally or more important the particular form of the tubes tends to dampen a violent flow of the air from the plenum chamber into the discharge ducts 11 (Figs. 1 and 2) or the discharge chest 91 (Fig. 3), whereby a so-called draftless flow of air into the serviced rooms is obtained.

Various other modifications will occur to those skilled in the art, without departing from the spirit of the invention defined in the appended claims.

I claim:

1. Air conditioning apparatus comprising a cabinet, a transverse vertical partition in said cabinet forming a machinery compartment and an air conditioning compartment, a body of water in said air conditioning compartment, an air receiver chamber in said machinery compartment adapted to receive air to be conditioned, a blower in said machinery compartment having its inlet connected to said receiver chamber, an outlet pipe leading from said blower through said partition into said air conditioning compartment, a plenum chamber mounted in said air conditioning compartment and enveloped by said water, said outlet pipe being connected thereto, a helically coiled outlet tube leading from said plenum chamber and extending through a wall of said air conditioning compartment, the capacity of which is substantially less than that of said plenum chamber, a heating tube within said air conditioning compartment and enveloped by said water and being mounted above the floor of said tank and below said plenum chamber, a refrigerant tube within said air conditioning compartment enveloped by said water and being mounted above said tank floor and below said plenum chamber.

2. Air conditioning apparatus as defined in claim 1, with a plurality of helically coiled tubes having total capacity smaller than that of said plenum chamber and extending through a wall of said air conditioning compartment.

3. Air conditioning apparatus as defined in claim 1, said machinery compartment containing a refrigerating unit connected to said refrigerant tube.

4. Air conditioning apparatus as defined in claim 1, said receiver chamber having a filter mounted therein to filter the air received prior to its entry into said blower.

5. Air conditioning apparatus as defined in claim 1, said heating tube having electrical heating means mounted therein.

References Cited in the file of this patent

UNITED STATES PATENTS

| 580,795 | McCarthy | Apr. 13, 1897 |
| 1,704,535 | Grafflin | Mar. 5, 1929 |
| 1,747,070 | Grafflin | Feb. 11, 1930 |
| 1,747,134 | Posey | Feb. 11, 1930 |
| 1,875,752 | Montero | Sept. 6, 1932 |
| 2,216,175 | Helbing | Oct. 1, 1940 |

FOREIGN PATENTS

| 101,897 | Australia | Sept. 9, 1937 |